May 27, 1947.  J. E. SHERLOCK  2,421,166
MEANS FOR GIVING WARNING OF THE FORMATION OF ICE ON AIRCRAFT
Filed April 24, 1942  4 Sheets-Sheet 1

INVENTOR
John Edward Sherlock
By Morris & Bateman
ATTORNEYS

May 27, 1947. J. E. SHERLOCK 2,421,166
MEANS FOR GIVING WARNING OF THE FORMATION OF ICE ON AIRCRAFT
Filed April 24, 1942 4 Sheets-Sheet 2

INVENTOR
John Edward Sherlock
By Norris + Bateman
ATTORNEYS

May 27, 1947. J. E. SHERLOCK 2,421,166
MEANS FOR GIVING WARNING OF THE FORMATION OF ICE ON AIRCRAFT
Filed April 24, 1942 4 Sheets-Sheet 3

INVENTOR
John Edward Sherlock
By Norris & Bateman
ATTORNEYS

May 27, 1947. J. E. SHERLOCK 2,421,166
MEANS FOR GIVING WARNING OF THE FORMATION OF ICE ON AIRCRAFT
Filed April 24, 1942 4 Sheets-Sheet 4
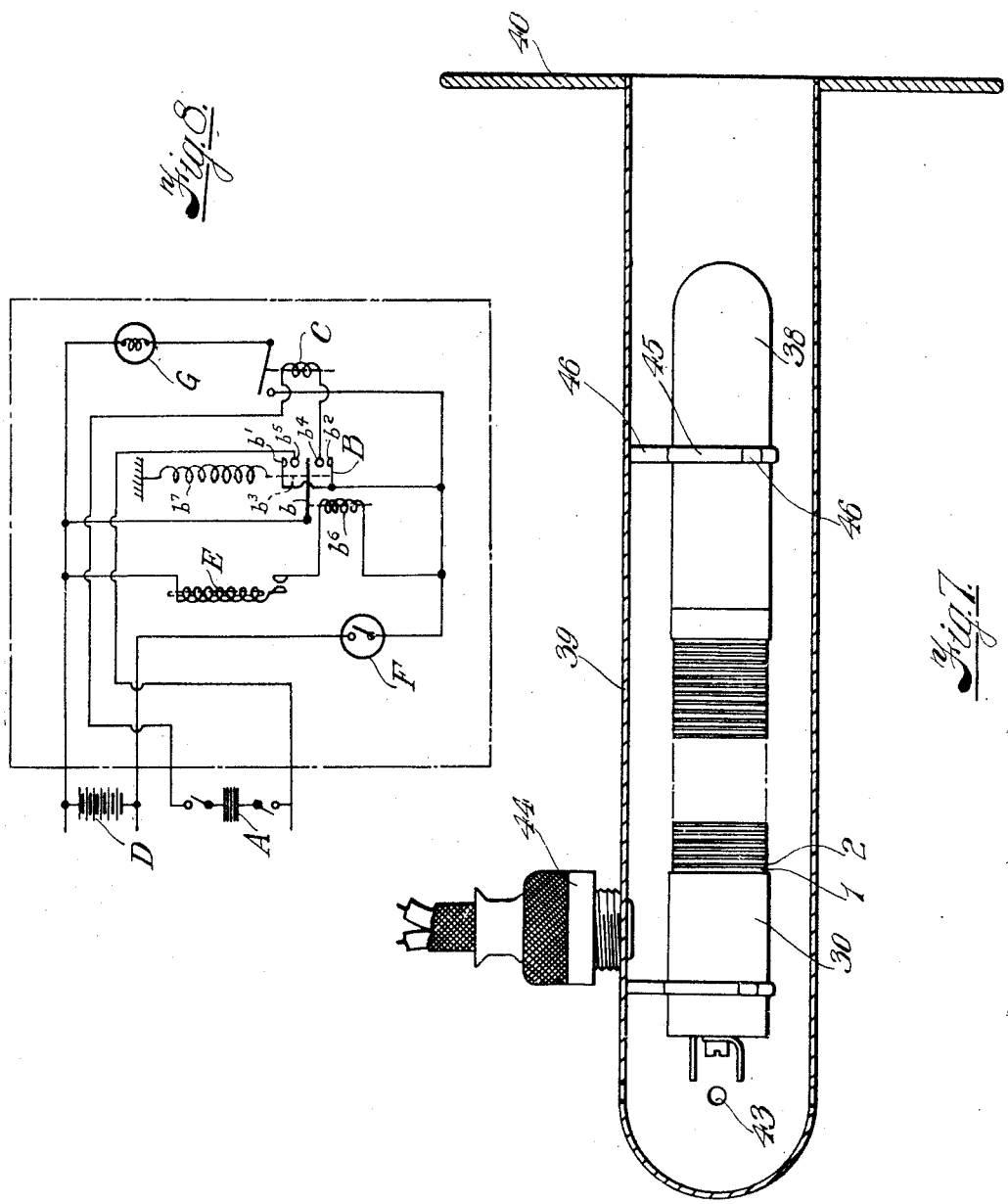
INVENTOR
John Edward Sherlock
By
ATTORNEYS Patented May 27, 1947

2,421,166

UNITED STATES PATENT OFFICE 2,421,166

MEANS FOR GIVING WARNING OF THE FORMATION OF ICE ON AIRCRAFT

John Edward Sherlock, Sunbury-on-Thames, England

Application April 24, 1942, Serial No. 440,382
In Great Britain June 11, 1940

7 Claims. (Cl. 177—311)

This invention relates to means for giving warning when an aircraft flies into a region in which ice may form on the propeller, wings or other surfaces and has for its object to provide an improved detector device for this purpose which is electrically operated and is responsive to a high degree of humidity so as to give warning before ice actually begins to form.

According to the invention means for detecting and giving warning of conditions favourable to ice formation on aircraft are provided consisting of an electrical detecting device sensitive to deposition of water on an insulating surface or surfaces, means for causing such deposition to occur at a relative humidity in the surrounding atmosphere of less than 100% and means actuated by the change of resistance caused by deposition of moisture to operate an electrically actuated signal to give warning of conditions favourable to the formation of ice.

According to one form of the invention a device for detecting and giving warning of conditions favourable to ice formation on aircraft is provided comprising a tube embodying electrical resistance elements and constructed so that a static pressure exists therein above that of the surrounding atmosphere for the purpose of anticipating atmospheric humidity conditions and thereby causing deposit of moisture on said resistance elements the fall in whose resistance is utilised to operate an electrically actuated device to give warning of approaching ice forming conditions.

According to another form of the invention a device for detecting and giving warning of conditions favourable to ice formation on aircraft is provided comprising a tube whose open end faces the wind and which has means for restricting the air flow through it, electrical resistance elements within the tube connected to thermostatic devices adapted to close switches under appropriate temperature conditions to complete the circuit of an electrical signal device when the deposition of moisture lowers the resistance of said resistance elements.

Reference will now be made to the accompanying drawings which illustrate applications of the invention and in which—

Fig. 6 is a sectional elevation of a modified form of detecting device, Fig. 7 is a sectional elevation of another modification and Fig. 8 is a diagram showing an electrical signal circuit.

Referring first to the construction illustrated in Figs. 1–5, the detecting element is composed of a number of annular silver discs 1 mounted co-axially but separately and electrically insulated the one from another by thin annular discs 2 which can conveniently be made of a transparent cellulose material.

Figure 1:
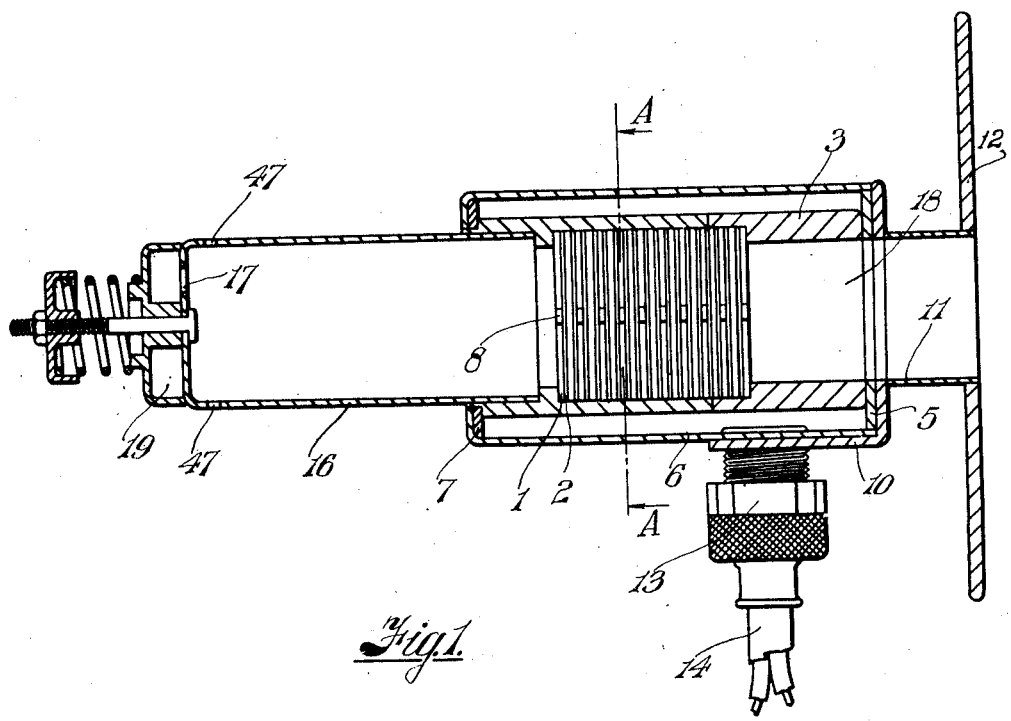
Fig. 1 is a sectional elevation of a detecting device.
Figure 2:
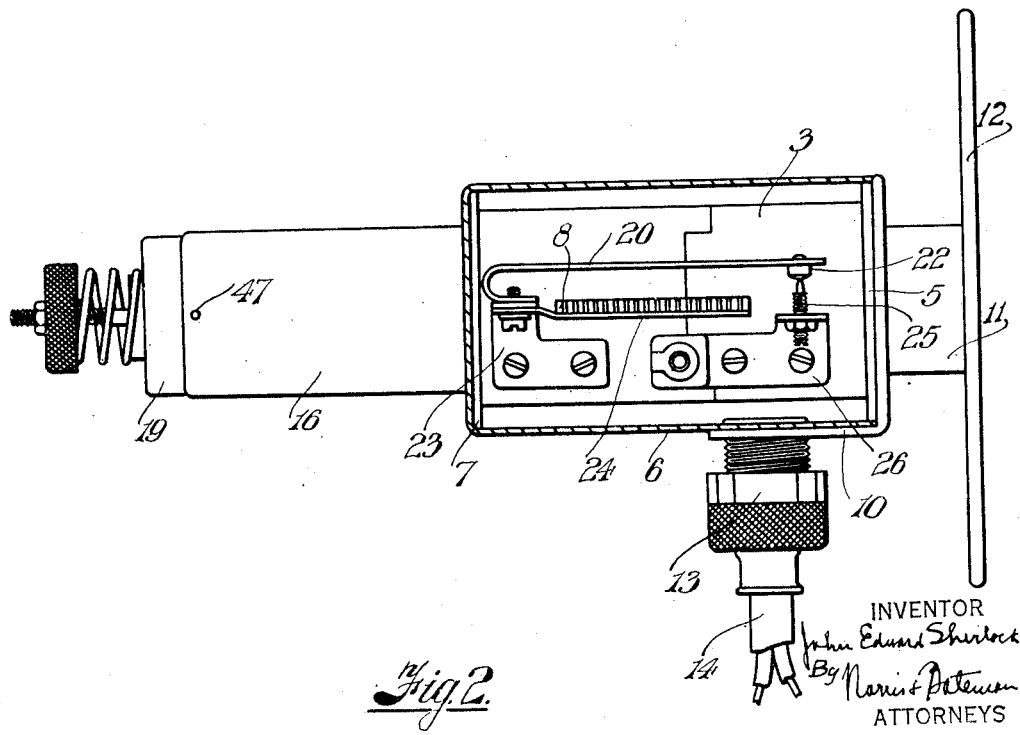
Fig. 2 is an outside elevation of the device shown in Fig. 1 with part of the cover removed.
Figure 3:
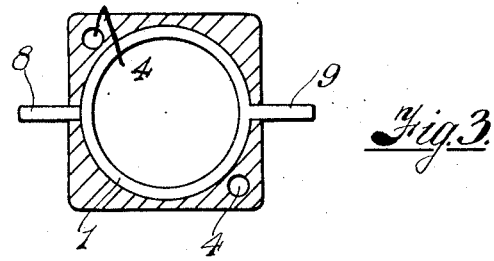
Fig. 3 is a sectional elevation taken on the line A—A of Fig. 1.
Figure 4:
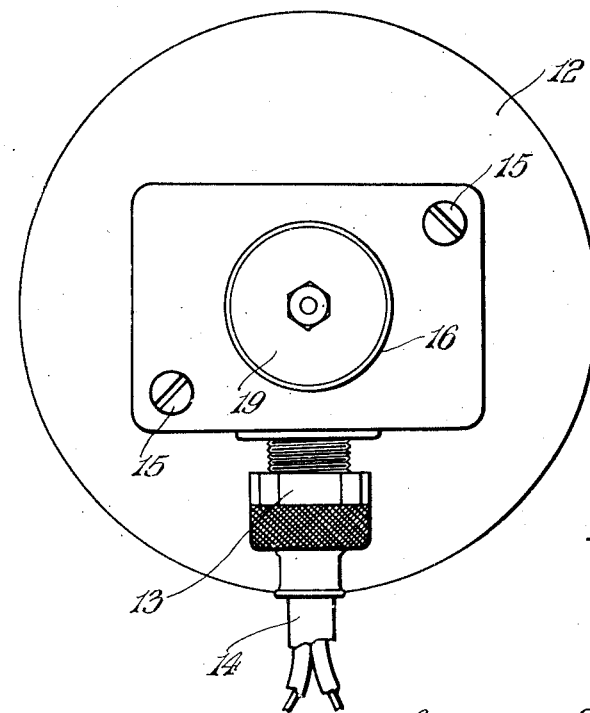
Fig. 4 is an end elevation of the device shown in Figs. 1 and 2.
Figure 5:
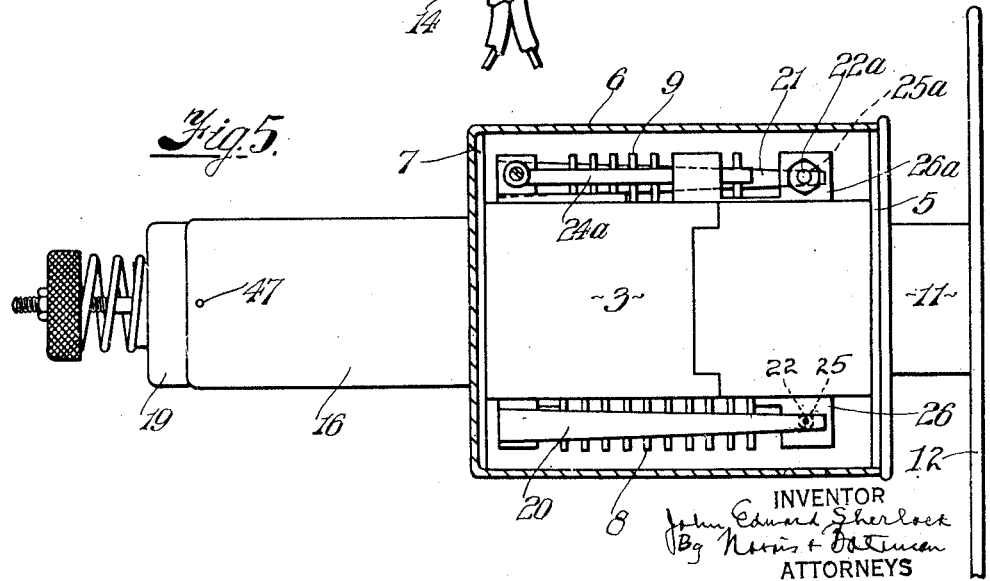
Fig. 5 is a plan of the device shown in Figs. 1, 2 and 4 with part of the cover removed.
Figure 9:
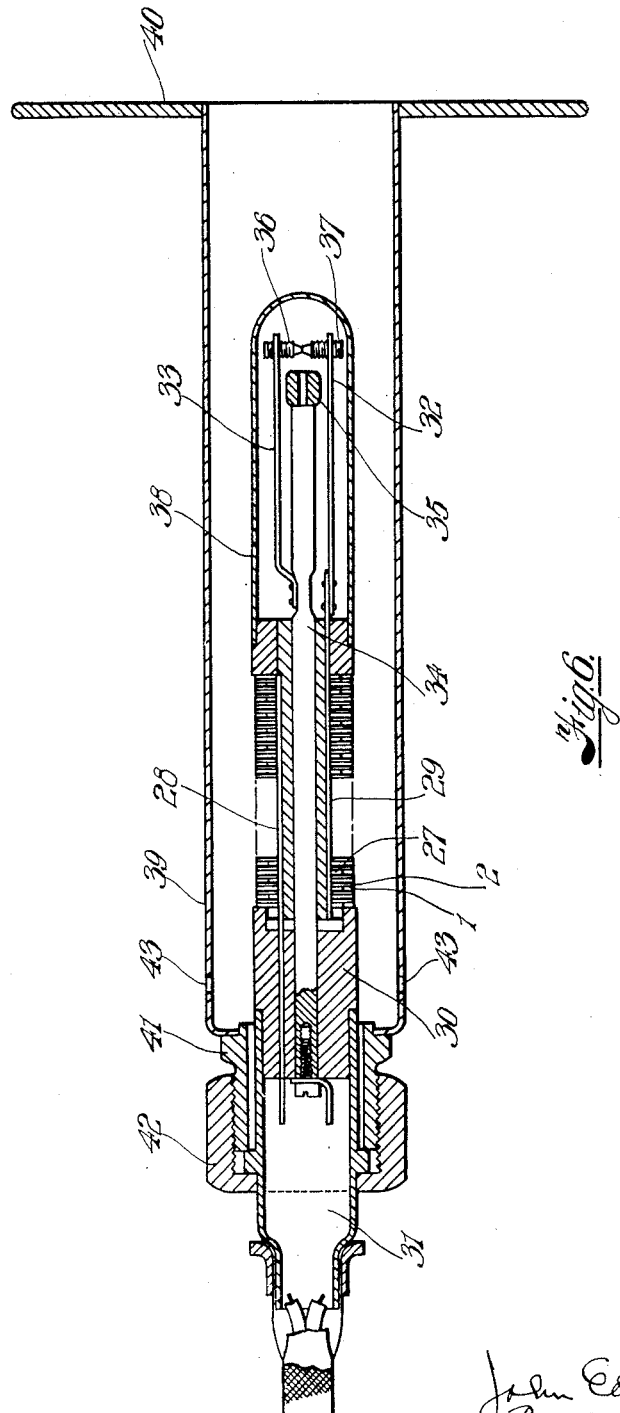

The discs 1 and 2 are located in a two-part housing 3 made of insulating material, the two parts being clamped together by means of bolts 4 (see Fig. 3) which are screw-threaded into tapped holes in an annular metal disc 5 mounted in one end of a casing 6 which encloses the discs 1 and 2 and the housing 3. The heads of the bolts 4 engage in counter-sunk holes in an annular plate 7 also mounted in one end of the casing 6 so that when the bolts 4 are tightened the housing 3 is clamped between the plates 5 and 7 and the silver and insulating discs 1 and 2 are tightly clamped together. The silver discs have tabs 8 and 9 which project outwards through the insulating housing 3, as shown in Fig. 3, the tabs of alternate discs projecting in opposite directions. The silver discs are thus arranged in two sets, and the tabs facilitate the connections of conductors to the discs so that alternate discs which belong to the respective sets are of opposite polarity.

The element so far described housed within the casing 6 is mounted on a bracket 10 to which is attached a tube 11 around the outer end of which is secured a front orifice plate 12, the bore of the bracket 10 and tube 11 being equal in diameter to that of the interior of the insulating housing 3 and discs 1 and 2.

The bracket 10 also carries a socket 13 for entry of electric conductors indicated at 14. The metal casing 6 is fixed by means of screws 15 (see Fig. 4) to the plate 7 and carries a tubular body 16 the inner or closed end of which is pierced by openings 17.

The arrangement above described provides, on assembly, a tubular pocket indicated generally by the numeral 18 which is open at its forward end within the plate 12 and has a smooth cylindrical inner wall part of which is constituted by the inner edges of the silver plates 1 and insulating discs 2. On the inner end of the pocket 18 there is mounted a spring loaded relief valve 19 which controls the openings 17 so as to limit the pressure which can be produced in the pocket 18 by the relative wind velocity. In addition small holes 47 are formed in the end of the tube 16 to facilitate escape of condensate.

Within the casing 6 there are also mounted two switches of the creeping contact type and each consisting of a bi-metallic strip 20 or 21 carrying a contact member 22 at one end and fixed at its opposite end to a terminal plate 23 secured on the exterior of the insulating housing 3.

The bi-metallic strip 20 is connected by a conductor 24 with the tabs 8 projecting from one side of the disc assembly and a similar connection 24a is provided between the second bi-metallic strip 21 and the tabs 9 on the other side of the disc assembly.

The contacts 22 and 22a at the ends of the bi-metallic strips are adapted to engage fixed contacts 25 and 25a mounted on terminal plates 26 and 26a to which the conductors 14 are connected respectively.

It will be seen, therefore, that the two alternating sets of silver discs constitute in effect a pair of terminals when the two pairs of switch contacts 22—25 and 22a—25a are both closed, the said terminals being electrically insulated the one from the other by the insulating discs 2.

The detector is capable of responding to a humidity of 100% but in order to anticipate conditions under which deposition of ice is likely to occur it is necessary to provide means for artificially increasing the humidity in the neighbourhood of the detector and the tubular pocket 18 in which the detector is mounted constitutes the means for this artificially increasing the humidity.

The operation of the device above described the tubular pocket 18 is placed in a position where its open end in the orifice plate 12 faces the wind. The pressure due to the relative wind velocity is transmitted along the tube so that the air in the neighbourhood of the detector constituted by the disc assembly 1—2 has a static pressure above that of the atmosphere surrounding the casing 6. This compression of the air increases the humidity by an amount which depends upon the degree of the compression and will thus anticipate conditions in which deposition of ice is likely to occur by causing deposition of moisture on the internal edges of the disc assembly 1—2.

Owing to the separation of the silver discs 1 by the insulating discs 2 the resistance of the detector is practically infinite when the device is dry but falls very considerably when moisture is deposited on the internal edge surfaces of the discs so that electric current can pass through the circuit if both thermostat switches are closed.

Of the two thermostats connected to the disc assembly one is set to open when the temperature falls below the desired operating range whilst the other is set to open when the temperature rises above this range. The range in question may and preferably does extend from 0° C. to 15° C. and the thermostat is connected as shown, in series with the detector in such a way as to open the detector circuit when the temperature rises above or falls below the desired operating range.

The manner in which the detector device is utilised to give a signal will be understood by reference to the circuit diagram constituting Fig. 8. The detector is indicated at A and is connected, as shown, with relay mechanism B and C adapted to be operated from battery D. Included in the circuit is a thermally operated flasher E and so long as the main switch F is closed this flasher operates continuously to energise the commutating relay B at intervals. The relay B has an armature $b$ which is mechanically connected to but electrically insulated from upper and lower contacts $b^1$ and $b^2$, as by an insulating coupling indicated by the dotted line $b^3$, the lower contact $b^2$ being engageable with a relatively fixed lower contact $b^4$ when the armature is lifted, and the upper contact $b^1$ being engageable with a relatively fixed upper contact $b^5$ when the armature is lowered, the movements of the armature being controlled by the energizing and de-energizing of the relay winding $b^6$. The armature $b$ and contacts $b'$ and $b^2$ may be biassed toward the upper position by a spring $b^7$. The circuit through the main relay C and detector A is thus commutated regularly under all conditions so that the polarity of the detector is periodically reversed. The primary object of this is to prevent the cumulative polarisation of the detector A by electrolytic action due to deposition of moisture on the discs 1 and 2, and thereby render the device immediately responsive to slight variations of humidity conditions above and below the point at which it is necessary that the warning signal be given.

In the operation of this system the flasher E and the commutating relay B operate continually as already described so that a circuit is repeatedly made through battery D main relay C and detector A, the polarity of the detector being repeatedly reversed. When the atmospheric conditions are such that both thermostat switches are closed and the humidity becomes sufficient to produce condensate on the inner surface of the detector constituted by the disc assembly 1—2, the resistance of the detector falls sufficiently to cause the main relay C to be energised so that an indicator lamp G is illuminated and gives a flashing signal, the flashing being produced by the operation of the commutating relay B. When a fall in the humidity of the air occurs and as soon as the surface of the detector element dries sufficiently the resulting increase in the resistance of the detector prevents the main relay C from being energised so that the flashing signal ceases. The repeated interruption of the circuit of the main relay C ensures that the signal will cease as soon as the resistance of the detector A rises to a value sufficient to prevent the main relay C from operating in the direction to close its contacts.

The system thus responds to a fall of humidity more promptly than it would do if the main relay C were continuously maintained in circuit. As soon as the relay contacts are closed the relay current must fall to a considerably lower value than that necessary to work the relay before the contacts are open. The operation of the signal system will also cease in the event of atmospheric temperature rising or falling to a point at which either of the thermostatic switches will open.

In the detector construction shown in Fig. 6 the detector proper consists as before of silver discs 1 alternating with insulating discs 2 but having the connecting tabs 27 projecting radially inwards to make contact with conductors 28 and 29 extending longitudinally through an insulating supporting body 30. One of these conductors 28 leads to a cable entry at 31 whilst the other 29 is connected to one of the contacts 32 of a double acting thermostat mounted on the free end of the insulating body 30, the other contact 33 of the thermostat being connected to a central conducting rod 34 which extends through the insulating body 30 to the cable entry 31.

The thermostat consists of two bi-metallic strips 32 and 33 arranged parallel to one another and between them is located a fixed stop 35 which is carried on the outer end of the rod 34. As the strips 32 and 33 flex with fall of temperature a point is reached when one of the strips abuts against the fixed stop 35. Further movement of the other strip then separates the terminal contacts 36 and 37 and this is arranged to occur on the lower temperature limit of the desired working range. On rise of temperature the strips flex in the opposite direction and when a certain temperature is reached the second strip abuts against the stop 35 so that the other strip can separate the contacts 36 and 37 by its continued movement. The thermostat is set to the required temperatures by flexing the strips 32 and 33 as necessary to give them the required set. The thermostat is contained in a metal casing 38 which forms with the detector assembly 1—2 a smooth walled cylindrical rod which is located centrally in a tubular pocket 39 terminating at its outer end in a circular orifice plate 40. In this construction, the relief valve is omitted and the inner end of the pocket 39 carries a screw threaded socket 41 within which the end of the insulator 30 is mounted and which is adapted to be engaged by a nut 42 which secures the cable entry 31 in position. Holes 43 in the pocket 39 allow free flow of air and also the escape of condensate from the pocket 39.

In the modification shown in Fig. 7 the detector construction differs only from that of Fig. 6 by the arrangement of the cable entry 44 which is disposed on the side instead of at the end of the pocket 39, and also in the method of supporting the detector and thermostat which are carried in rings 45 each having three radial arms 46 which maintain the detector in a central position within the pocket 39.

Either of the detectors shown in Fig. 6 or 7 can be employed to cause operation of a signal circuit in the manner already described with reference to Fig. 8.

I claim:

1. A device for detecting and giving warning of the approach of conditions favorable to ice formation on aircraft, comprising a tube having an open end and means for mounting it on an aircraft with its opened end arranged to face the wind, apertures being provided at the opposite end of said tube for increasing the static pressure within the tube by restricting the air flow through it, electrical resistance elements consisting of series of metallic rings alternating with rings of insulating material disposed in said tube, and an electrical circuit connected to said resistance elements and adapted to be completed by deposition of moisture on said electrical resistance elements.

2. In an electrical signal system for giving warning of the approach of conditions favorable to ice formation on aircraft, a detector comprising a tube having an open entrance end and means for mounting it on an aircraft with its open entrance end arranged to face the wind, and having means at its other end for restricting discharge of air from the tube and thereby develop a pressure of air within the tube which is above the pressure of the ambient atmosphere, and electrically conductive elements having means for connecting them in the system, and having insulating elements alternating therewith, said elements being disposed within the tube between its entrance and discharge ends and forming an electrical resistance device whose resistance is lowered by the deposition of moisture thereon.

3. A device for detecting and giving warning of the approach of conditions favorable to ice formation on aircraft, comprising a tube having an open entrance end and means for mounting the tube on an aircraft with its open entrance end arranged to face the wind, a closure on the opposite end for restricting air flow through said tube and thereby develop a pressure of air therein which is above that of the ambient atmosphere, and electrically conductive elements alternating with insulating elements spaced longitudinally within said tube between its ends to form an electrical resistance device whose resistance is lowered by the deposition of moisture thereon.

4. A device for detecting and giving warning of the approach of conditions favorable to ice formation on aircraft, comprising a tube open at one end and having means for mounting it on an aircraft with its open end facing the wind, means for restricting discharge of air from the tube to develop therein a static pressure above that of the ambient atmosphere, electrical resistance elements disposed within said tube and having means whereby the deposition of moisture lowers the resistance of said elements, and means for connecting said elements to an electrical indicating circuit.

5. A device for detecting and giving warning of the approach of conditions favorable to ice formation on aircraft according to claim 4, wherein said resistance elements are arranged in two separate sets, and each set has means for connecting it to said electrical circuit.

6. A device for detecting and giving warning of the approach of conditions favorable to ice formation on aircraft, comprising a tube having an open end and means for mounting it on an aircraft with its open end arranged to face the wind, at least one aperture being provided at the end of said tube remote from said open end to restrict discharge of air from the tube and thereby develop therein a static pressure above that of the ambient atmosphere, alternating metal rings and insulators disposed within said tube between its open end and said aperture, and means for connecting said rings to an electrical circuit adapted to be made conductive by deposition of moisture on said insulators.

7. A device for detecting and giving warning of the approach of conditions favorable to ice formation on aircraft, comprising a tube having an open end adapted to face the wind, apertures being provided at the opposite end of said tube for increasing the static pressure within the tube by restricting the air flow through it, electrical resistance elements consisting of series of metallic rings alternating with rings of insulating material disposed in said tube, an electrical circuit connected to said resistance elements and having means for connecting it to an electric signalling device adapted to be operated when said circuit is completed by deposition of moisture on said electrical resistance elements, a source of electric current supply for said circuit, a main relay for controlling said signalling device, said relay being connected in said circuit with said resistance elements and energized therethrough in response to deposition of moisture on the insulating material between said resistance elements, a commutating relay connected in said circuit and operative to alternately reverse the polarity of said resistance elements, and means connected in said circuit for periodically operating the commutating relay.

JOHN EDWARD SHERLOCK.

REFERENCES CITED

The following references are of record in the file of this patent:

UNITED STATES PATENTS

| Number | Name | Date |
|---|---|---|
| 2,127,538 | Seiger | Aug. 23, 1938 |
| 2,182,530 | Baer | Dec. 5, 1939 |
| 1,749,826 | Lubach | Mar. 11, 1930 |
| 2,015,125 | Polin | Sept. 24, 1935 |

FOREIGN PATENTS

| Number | Country | Date |
|---|---|---|
| 446,983 | Great Britain | May 11, 1936 |
| 544,226 | Great Britain | Apr. 2, 1942 |